(12) United States Patent
Hama et al.

(10) Patent No.: US 6,446,521 B1
(45) Date of Patent: Sep. 10, 2002

(54) TRACTOR TRANSMISSION

(75) Inventors: Masaaki Hama, Kawachinagano; Kenji Kato, Sakai; Isamu Yamanishi, Takaishi; Masao Takagi, Hashimoto, all of (JP)

(73) Assignee: Kubota Corporation (JP)

( * ) Notice: Subject to any disclaimer, the term of this patent is extended or adjusted under 35 U.S.C. 154(b) by 107 days.

(21) Appl. No.: 09/652,988

(22) Filed: Aug. 31, 2000

(30) Foreign Application Priority Data

Nov. 4, 1999 (JP) .......................................... 11-313817
Nov. 4, 1999 (JP) .......................................... 11-313826

(51) Int. Cl.[7] .............................................. F16H 59/04
(52) U.S. Cl. ........................ 74/335; 74/745; 74/473.19
(58) Field of Search ..................... 74/745, 335, 473.19, 74/473.2

(56) References Cited

U.S. PATENT DOCUMENTS

| | | | |
|---|---|---|---|
| 2,772,652 A | * 12/1956 | Shane et al. | 74/473.33 |
| 2,775,134 A | * 12/1956 | Swenson | 74/473.33 |
| 3,433,087 A | * 3/1969 | Winter et al. | 74/473.19 |
| 4,216,680 A | 8/1980 | Hayashi et al. | 74/473 |
| 4,615,240 A | 10/1986 | Weiss | |
| 4,698,048 A | * 10/1987 | Rundle | 74/473.19 |
| 6,138,528 A | * 10/2000 | Fukumoto et al. | 74/745 |

FOREIGN PATENT DOCUMENTS

| | | |
|---|---|---|
| GB | 2090350 | 7/1982 |
| GB | 2129385 | 5/1984 |
| JP | 63215433 | 9/1988 |
| JP | 10287145 | 10/1998 |

OTHER PUBLICATIONS

Patent Abstracts of Japan No. 63215433, published Sep. 7, 1988, entitled "Running Speed Change Control Structure for Agricultural Tractor", 1 page.

* cited by examiner

Primary Examiner—Sherry Estremsky
(74) Attorney, Agent, or Firm—Webb Ziesenheim Logsdon Orkin & Hanson, P.C.

(57) ABSTRACT

A tractor transmission includes a change speed mechanism, a shift lever (30) for shifting the change speed mechanism, a super-reduction mechanism (16) for decelerating and outputting power inputted thereto, the super-reduction mechanism having a larger reduction ratio than the change speed mechanism, and an overdrive mechanism (45) for accelerating and outputting power inputted thereto. A single switching device (29) is provided for operating both the super-reduction mechanism and overdrive mechanism. The switching device is shiftable, when the super-reduction mechanism is in neutral, from a state of operating the super-reduction mechanism to a state of operating the overdrive mechanism.

8 Claims, 15 Drawing Sheets

Fig. 15

[forward]

| | speed | main c.s. | | | | aux. c.s. | | h/l | | overdrive | |
|---|---|---|---|---|---|---|---|---|---|---|---|
| | | 1st | 2nd | 3rd | 4th | L | H | Lo | Hi | off | on |
| super-red. off | 1 | O | | | | O | | O | | O | |
| | 2 | O | | | | O | | | O | O | |
| | 3 | | O | | | O | | O | | O | |
| | 4 | | O | | | O | | | O | O | |
| | 5 | | | O | | O | | O | | O | |
| | 6 | | | O | | O | | | O | O | |
| | 7 | | | | O | O | | O | | O | |
| | 8 | | | | O | O | | | O | O | |
| | 9 | O | | | | | O | | O | O | |
| | 10 | | O | | | | O | | O | O | |
| | 11 | | | O | | | O | | O | O | |
| | 12 | | | | O | | O | | O | O | |
| super-red. on | 1 | O | | | | O | | O | | O | |
| | 2 | O | | | | O | | | O | O | |
| | 3 | | O | | | O | | O | | O | |
| | 4 | | O | | | O | | | O | O | |
| | 5 | | | O | | O | | O | | O | |
| | 6 | | | O | | O | | | O | O | |
| | 7 | | | | O | O | | O | | O | |
| | 8 | | | | O | O | | | O | O | |
| | 9 | O | | | | | O | | O | O | |
| | 10 | | O | | | | O | | O | O | |
| | 11 | | | O | | | O | | O | O | |
| | 12 | | | | O | | O | | O | O | |
| overdrive | 1 | O | | | | — | — | | O | | O |
| | 2 | | O | | | — | — | | O | | O |
| | 3 | | | O | | — | — | O | | | O |
| | 4 | | | O | | — | — | | O | | O |
| | 5 | | | | O | — | — | O | | | O |
| | 6 | | | | O | — | — | | O | | O |

Fig. 16

| [backward] | speed | main c. s. | | | | aux. c. s. | | h/l | | overdrive | |
|---|---|---|---|---|---|---|---|---|---|---|---|
| | | 1st | 2nd | 3rd | 4th | L | H | Lo | Hi | off | on |
| | 1 | O | | | | O | | — | — | O | |
| | 2 | | O | | | O | | — | — | O | |
| | 3 | | | O | | O | | — | — | O | |
| | 4 | | | | O | O | | — | — | O | |
| | 5 | O | | | | | O | — | — | O | |
| | 6 | | O | | | | O | — | — | O | |
| | 7 | | | O | | | O | — | — | O | |
| | 8 | | | | O | | O | — | — | O | |
| overdrive | 1 | O | | | | — | — | — | — | | O |
| | 2 | | O | | | — | — | — | — | | O |
| | 3 | | | O | | — | — | — | — | | O |
| | 4 | | | | O | — | — | — | — | | O |

TRACTOR TRANSMISSION

BACKGROUND OF THE INVENTION

1. Field of the Invention

This invention relates to a tractor transmission having a change speed mechanism, a shift lever for shifting the change speed mechanism, a super-reduction mechanism having a larger reduction ratio than the change speed mechanism for decelerating and outputting drive inputted thereto, and an overdrive mechanism for accelerating and outputting drive inputted thereto.

2. Description of the Related Art

A typical tractor transmission known in the art, as disclosed in Japanese Patent Laying-Open Publication H10-287145 for example, has separate control devices for controlling the super-reduction mechanism and overdrive mechanism. The increased number of control devices adds to the difficulty in securing an installation space. It is also necessary to provide a check mechanism for disabling a simultaneous operation of the two control devices. This check mechanism is complicated and causes cost increases.

In the tractor with the transmission having the super-reduction mechanism and overdrive mechanism besides the ordinary change speed mechanism, the super-reduction mechanism and overdrive mechanism are selectively used according to operating conditions. Of course, the number of speeds finally produced is the same whether the super-reduction mechanism or overdrive mechanism is used or not.

However, an optimal number of speeds is variable with operating conditions. It is desirable to vary the number of speeds finally provided by the use of the super-reduction mechanism or overdrive mechanism according to operating conditions.

SUMMARY OF THE INVENTION

An object of this invention to provide a simplified control system for a super-reduction mechanism and an overdrive mechanism. It is another object of the invention to improve the work efficiency of a tractor with a transmission having a super-reduction mechanism and an overdrive mechanism.

The above object is fulfilled, according to this invention, by a tractor transmission comprising a change speed mechanism, a shift lever for shifting the change speed mechanism, a super-reduction mechanism for decelerating and outputting power inputted thereto, the super-reduction mechanism having a larger reduction ratio than the change speed mechanism, an overdrive mechanism for accelerating and outputting power inputted thereto, and a single switching device for operating both the super-reduction mechanism and the overdrive mechanism, the switching device is shiftable, when the super-reduction mechanism is in neutral, from a state of operating the super-reduction mechanism to a state of operating the overdrive mechanism.

In this construction, the super-reduction mechanism and overdrive mechanism are operable by the single switching device, thereby simplifying the control device. Only when the super-reduction mechanism is in neutral, the switching device is shiftable from the state of operating the super-reduction mechanism to the state of operating the overdrive mechanism. The super-reduction mechanism must be placed in neutral whenever overdrive controls are effected. Thus, no check mechanism is required for disabling a simultaneous operation of the two mechanisms.

As a preferred embodiment for specifically achieving the above features, a construction is proposed wherein the switching device has a shifting region including a super-reduction control region for operating the super-reduction mechanism, an overdrive control region for operating the overdrive mechanism, and a bridge region bridging the super-reduction control region and the overdrive control region, the super-reduction mechanism being in neutral when the switching device is located at a point in the super-reduction control region for shifting to the bridge region. To give the driver a clear indication as to shifting between the super-reduction control region and overdrive control region, the bridge region preferably extends substantially perpendicular to the super-reduction control region and the overdrive control region.

In a preferred embodiment of this invention, an overdrive detecting sensor is provided for detecting the switching device having shifted from the bridge region to the overdrive control region. This construction enables a prompt control operation which must be carried out in using the overdrive mechanism.

In a further preferred embodiment, a speed display surface is provided for displaying speed stages of the overdrive mechanism as well as speed stages of the change speed mechanism. In this construction, when the overdrive mechanism is used and the shift lever is operated for shifting the change speed mechanism, the driver may confirm the speed stages when using the overdrive mechanism, from the speed display surface provided for displaying the speed stages of the overdrive mechanism. This improves operability of the shift lever when the overdrive mechanism is used.

To improve the work efficiency of a tractor with a transmission having a super-reduction mechanism and an overdrive mechanism, this invention proposes a tractor transmission comprising a change speed mechanism, a shift lever for shifting the change speed mechanism, a super-reduction mechanism for decelerating and outputting power inputted thereto, the super-reduction mechanism having a larger reduction ratio than the change speed mechanism, an overdrive mechanism for accelerating and outputting power inputted thereto, and a switching device for switching the overdrive mechanism, wherein the change speed mechanism has a speed stage determined by a shift position of the shift lever, the speed stage being variable with a control position of the switching device.

This construction provides a different final number of speed stages when the switching device is operated to vary a running state, i.e. when the overdrive mechanism is used. Thus, a large number of speeds are made available for a field operation, i.e. when the overdrive mechanism is unused. When moving at high speed, e.g. from one field to another, by using the overdrive mechanism, a reduced number of speeds are provided, a large number of speeds being unnecessary.

Other features and advantages of this invention will be apparent from the following description of the embodiment to be taken with reference to the drawings.

BRIEF DESCRIPTION OF THE DRAWINGS

FIG. 15 shows a table of a relationship between forward speed stages and operative states of the change speed mechanisms.

FIG. 16 shows a table of a relationship between backward speed stages and operative states of the change speed mechanisms.

DESCRIPTION OF THE PREFERRED EMBODIMENT

Figure 1:
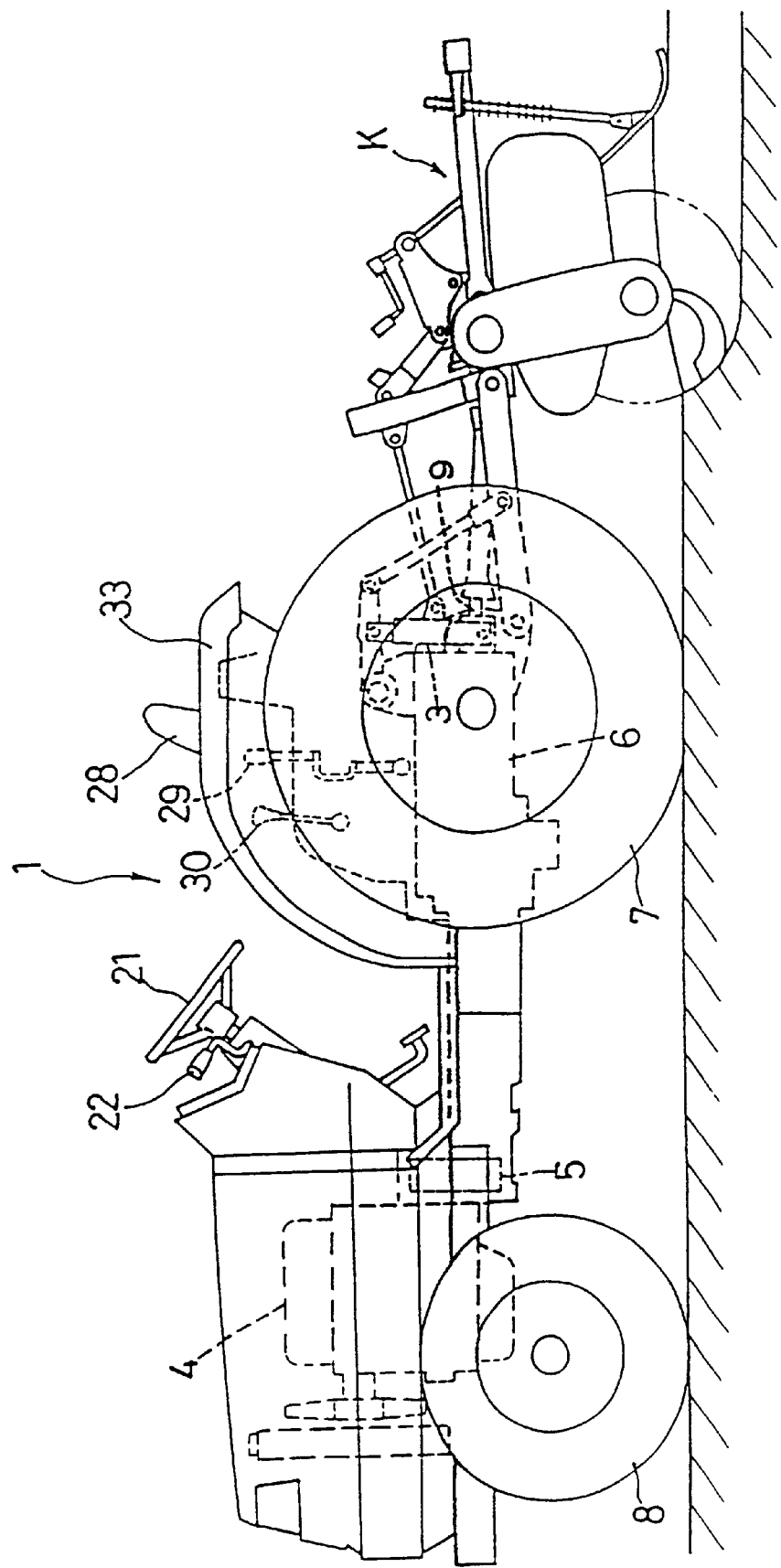
FIG. 1 is a side elevation of a tractor.

FIG. 1 shows a side elevation of a tractor having a transmission according to this invention. This tractor is an agricultural tractor having a tractor body 1 with a rotary plow K coupled to the rear end thereof to be vertically movable by an external lift cylinder 3. The tractor is controllable by a rider to engage in a plowing operation. Output of an engine 4 mounted on the front of tractor body 1 is transmitted through a main clutch 5 to a transmission 6 where the power is branched to a propelling line and a PTO line. The power branched to the propelling line is put to an appropriate change speed to rear wheels 7 acting as main drive wheels and front wheels 8 acting as dirigible wheels. The power branched to the PTO line also is put to an appropriate change speed, and transmitted to the rotary plow K through a PTO shaft 9 disposed in a rear position of tractor body 1.

Figure 2:
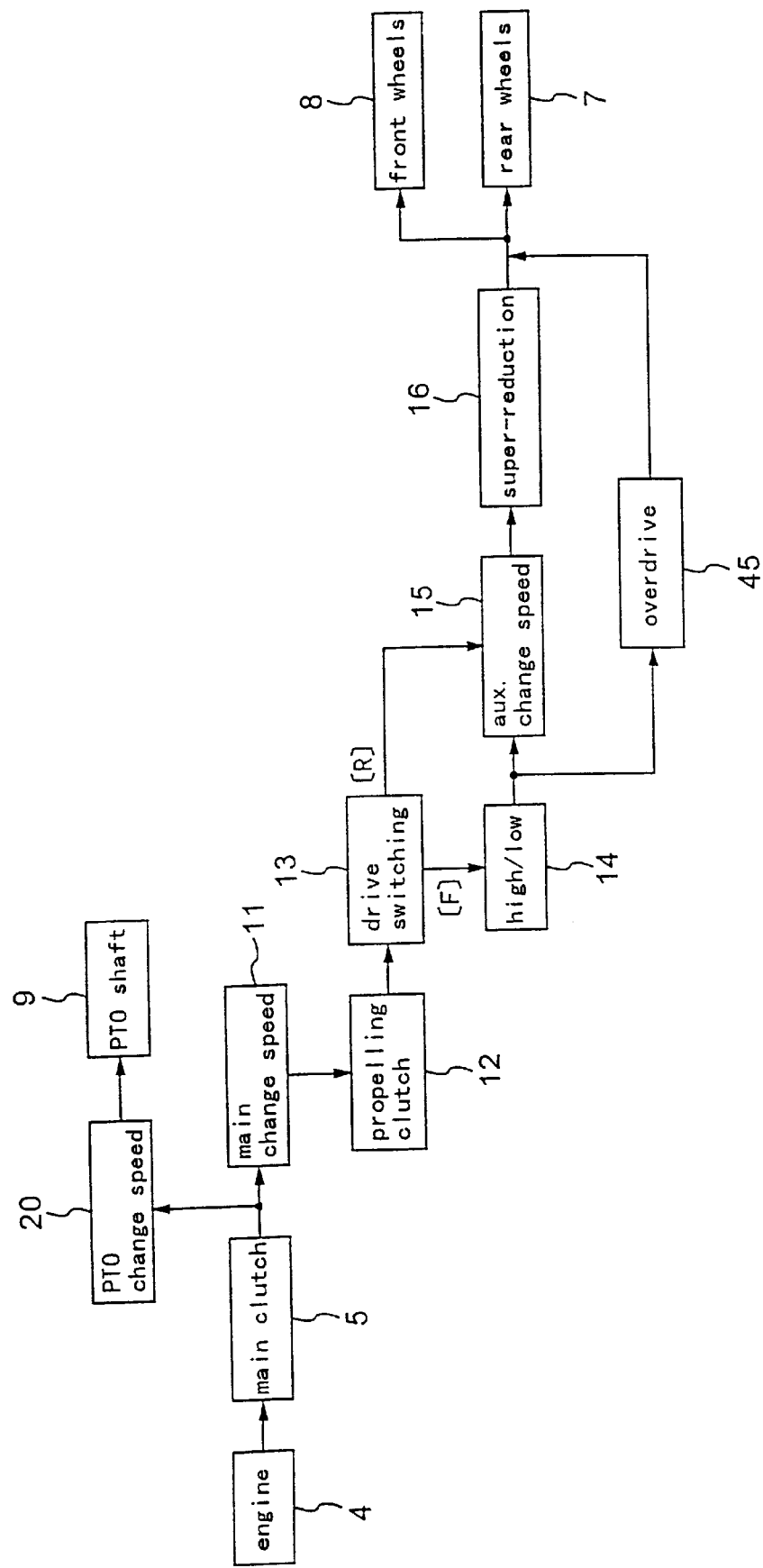
FIG. 2 is a block diagram of a drive transmission line.
Figure 3:
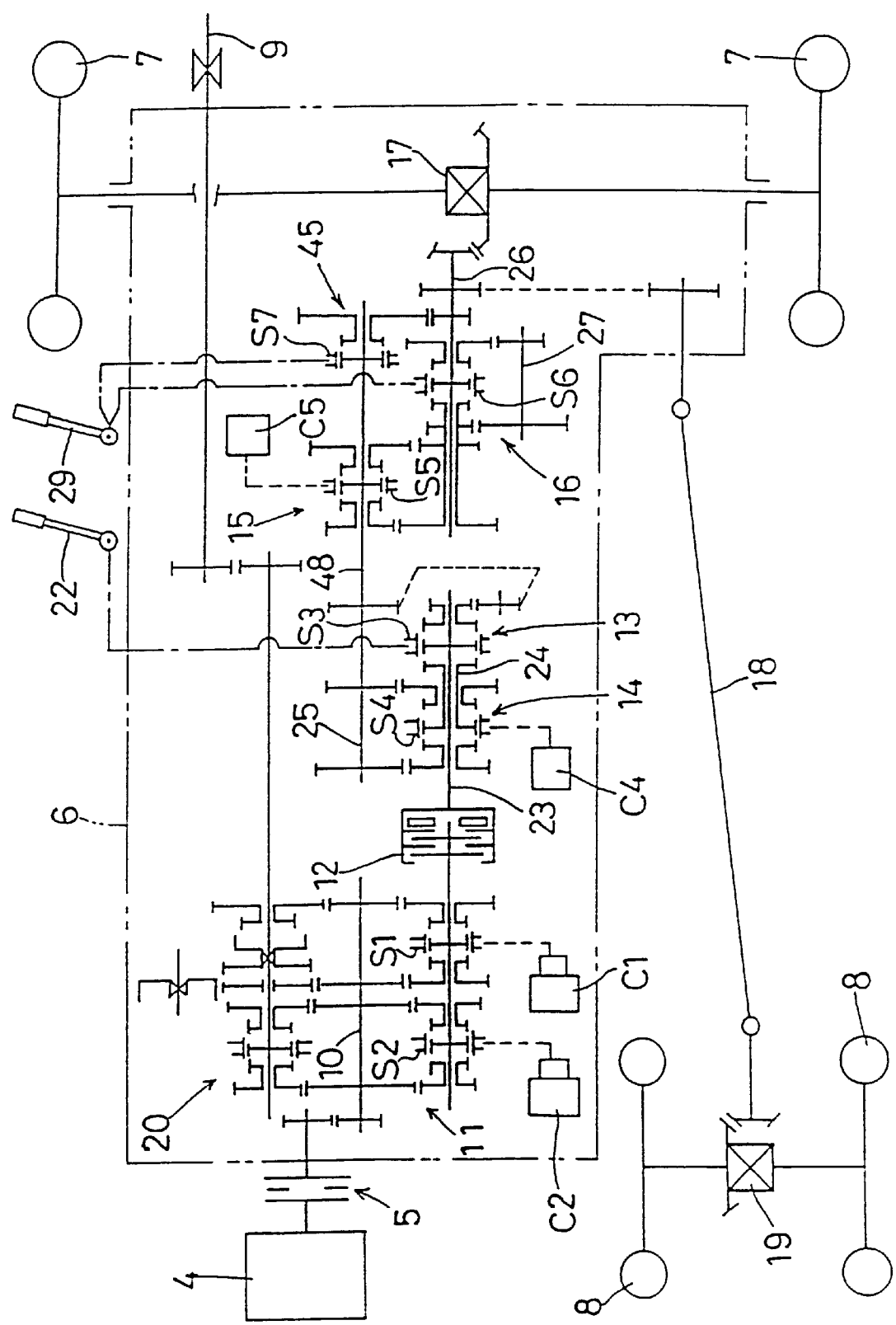
FIG. 3 is a schematic view of the drive transmission line.

FIG. 2 is a block diagram schematically showing the transmission line. FIG. 3 schematically shows the transmission 6. The engine output transmitted through the main clutch 5 to the transmission 6 is branched to the propelling line and PTO line through a counter shaft 10. The propelling line includes, arranged in series, a main change speed mechanism 11 for providing four speeds, a multidisk change speed hydraulic clutch 12, a backward and forward drive switching mechanism 13, a high/low change speed mechanism 14 for providing two, high and low, speeds with a small gear ratio, an auxiliary change speed mechanism 15 for providing two, high and low, speeds with a large gear ratio, and a super-reduction mechanism 16. An overdrive mechanism 45 is disposed parallel to the auxiliary change speed mechanism 15 and super-reduction mechanism 16.

The main change speed mechanism 11, backward and forward drive switching mechanism 13, high/low change speed mechanism 14 and auxiliary change speed mechanism 15 are collectively called herein a change speed mechanism for providing a plurality of running speeds. The super-reduction mechanism 16 and overdrive mechanism 45 are selectively used according to each type of operation performed by the tractor.

The power having undergone change speed operations by these change speed mechanisms is transmitted to the rear wheels 7 through a rear differential 17, and to the front wheels 8 through a transmission shaft 18 and a front differential 19. The PTO line includes a PTO change speed mechanism 20 for changing the power branched thereto by the counter shaft 10 to three forward speeds and one backward speed for transmission to the PTO shaft 9.

As shown in FIG. 3, the main change speed mechanism 11 includes two shift sleeves S1 and S2 selectively shiftable to provide four speeds. The first speed is provided when the shift sleeve S1 is shifted rearward with the shift sleeve S2 maintained in neutral. The second speed is provided when the shift sleeve S1 is shifted forward with the shift sleeve S2 maintained in neutral. The third speed is provided when the shift sleeve S2 is shifted rearward with the shift sleeve S1 maintained in neutral. The fourth speed is provided when the shift sleeve S2 is shifted forward with the shift sleeve S1 maintained in neutral. The shift sleeves S1 and S2 are shiftable by hydraulic cylinders C1 and C2 acting also as sequence valves, respectively.

The backward and forward drive switching mechanism 13 includes a shift sleeve S3 shiftable forward to provide forward drive and rearward to provide backward drive. The shift sleeve S3 is interlocked to a backward and forward drive switching lever 22 disposed at a left side of a steering wheel 21.

When the backward and forward drive switching mechanism 13 is operated to a forward position, power is transmitted from a transmission shaft 23 at the output side of change speed hydraulic clutch 12 to the high/low change speed mechanism 14 through an intermediate idle shaft 24. The power having undergone a change speed operation by the high/low change speed mechanism 14 is transmitted to the auxiliary change speed mechanism 15 through a change speed shaft 25. When the backward and forward drive switching mechanism 13 is operated to a backward position, power is transmitted from the transmission shaft 23 directly to the change speed shaft 25 without passing through the high/low change speed mechanism 14.

The high/low change speed mechanism 14 includes a shift sleeve S4 shiftable forward to provide a low speed "Lo" and rearward to provide a high speed "Hi". The gear ratio between the high speed and low speed is set smaller than the gear ratio between speed stages provided by the main change speed mechanism 11. The shift sleeve S4 is shiftable by a hydraulic cylinder C4 acting also as a sequence valve.

The auxiliary change speed mechanism 15 includes a shift sleeve S5 shiftable forward to provide a low speed "L" and rearward to provide a high speed "H". The gear ratio between the high speed and low speed is set larger than the gear ratio between the speed stages provided by the main change speed mechanism 11. The shift sleeve S5 is shiftable by a hydraulic cylinder C5 acting also as a sequence valve.

The super-reduction mechanism 16 includes a shift sleeve S6 shiftable forward to provide a "super-reduction OFF state" whereby change speed output of the auxiliary change speed mechanism 15 is transmitted directly to a final change speed shaft 26. The shift sleeve S6 is shiftable rearward to provide a "super-reduction ON state" whereby change speed output of the auxiliary change speed mechanism 15 is greatly reduced while passing through a reduction shaft 27, to be transmitted to the final change speed shaft 26. A "neutral position" is provided intermediate between the "super-reduction OFF state" and "super-reduction ON state". The shift sleeve S6 is operable by a switching device 29 disposed at the left side and rearwardly of a driver's seat 28.

The overdrive mechanism 45 includes a shift sleeve S7 shiftable forward to provide an "overdrive OFF state"

whereby change speed output of the auxiliary change speed mechanism 15 is transmitted, bypassing the overdrive mechanism 45, to the final change speed shaft 26. The shift sleeve S7 is shiftable rearward to provide an "overdrive ON state" whereby change speed output of the auxiliary change speed mechanism 15 is greatly accelerated while passing through the overdrive mechanism 45, to be transmitted to the final change speed shaft 26. The shift sleeve S7 is operable by the switching device 29 disposed at the left side and rearwardly of the driver's seat 28. That is, the switching device 29 is used to operate both the super-reduction mechanism 16 and overdrive mechanism 45, as described in detail hereinafter.

Figure 4:
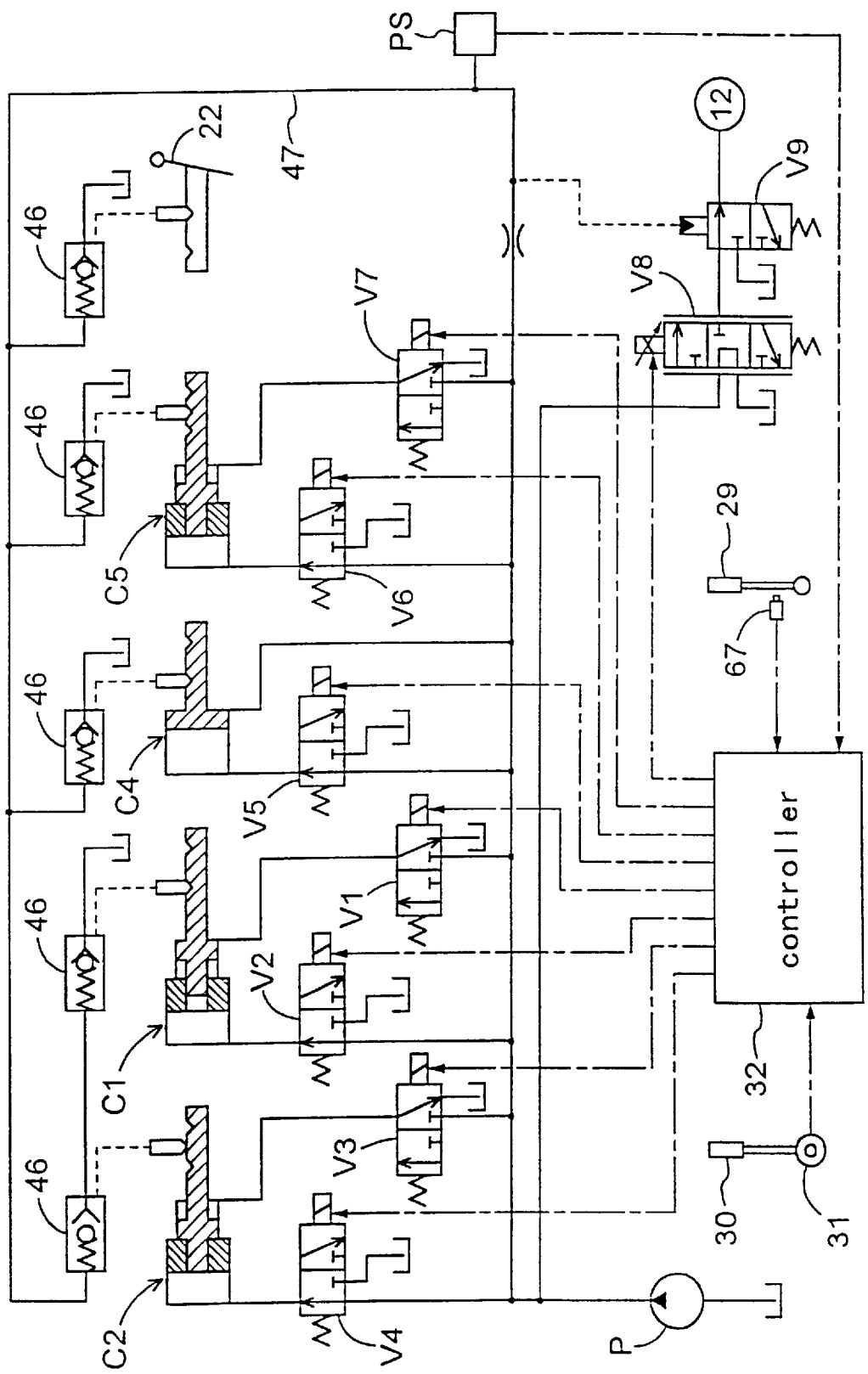
FIG. 4 is a schematic view of a hydraulic circuit for shift controls.

FIG. 4 shows the hydraulic cylinders C1 and C2 for operating the main change speed mechanism 11, the hydraulic cylinder C3 for operating the auxiliary change speed mechanism 15, the hydraulic cylinder C4 for operating the high/low change speed mechanism 14, and a hydraulic control circuit for controlling the change speed hydraulic clutch 12. In FIG. 4, references V1–V7 denote electromagnetic unloading valves. Reference V8 denotes an electromagnetic proportional control valve. Reference V9 denotes a pilot operated unloading valve. Reference 30 denotes a shift lever disposed at the left side of driver's seat 28 to be rockable fore and aft. Reference 31 denotes a potentiometer for detecting a position to which the shift lever 30 is operated. The electromagnetic unloading valves V1–V6 and electromagnetic proportional control valve V7 are all connected to a controller 32.

Figure 5:
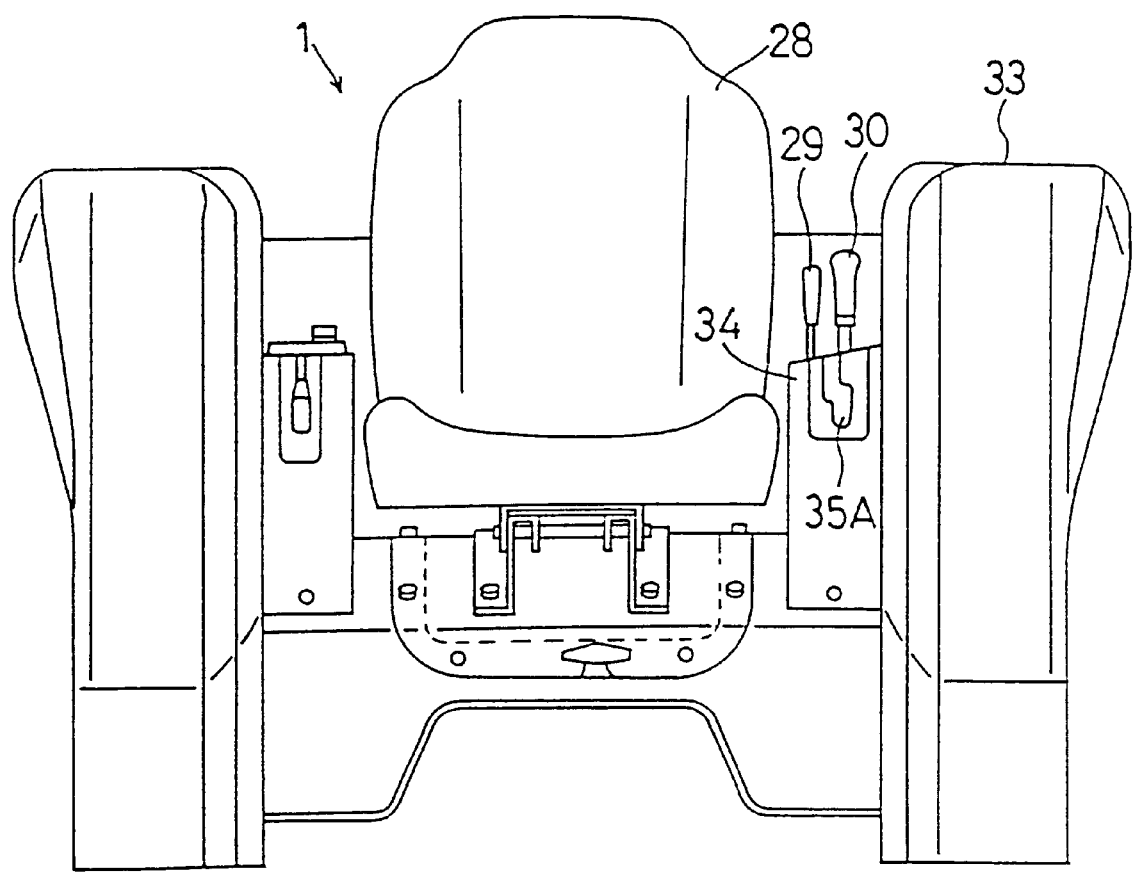
FIG. 5 is a front view of a driving platform.
Figure 6:
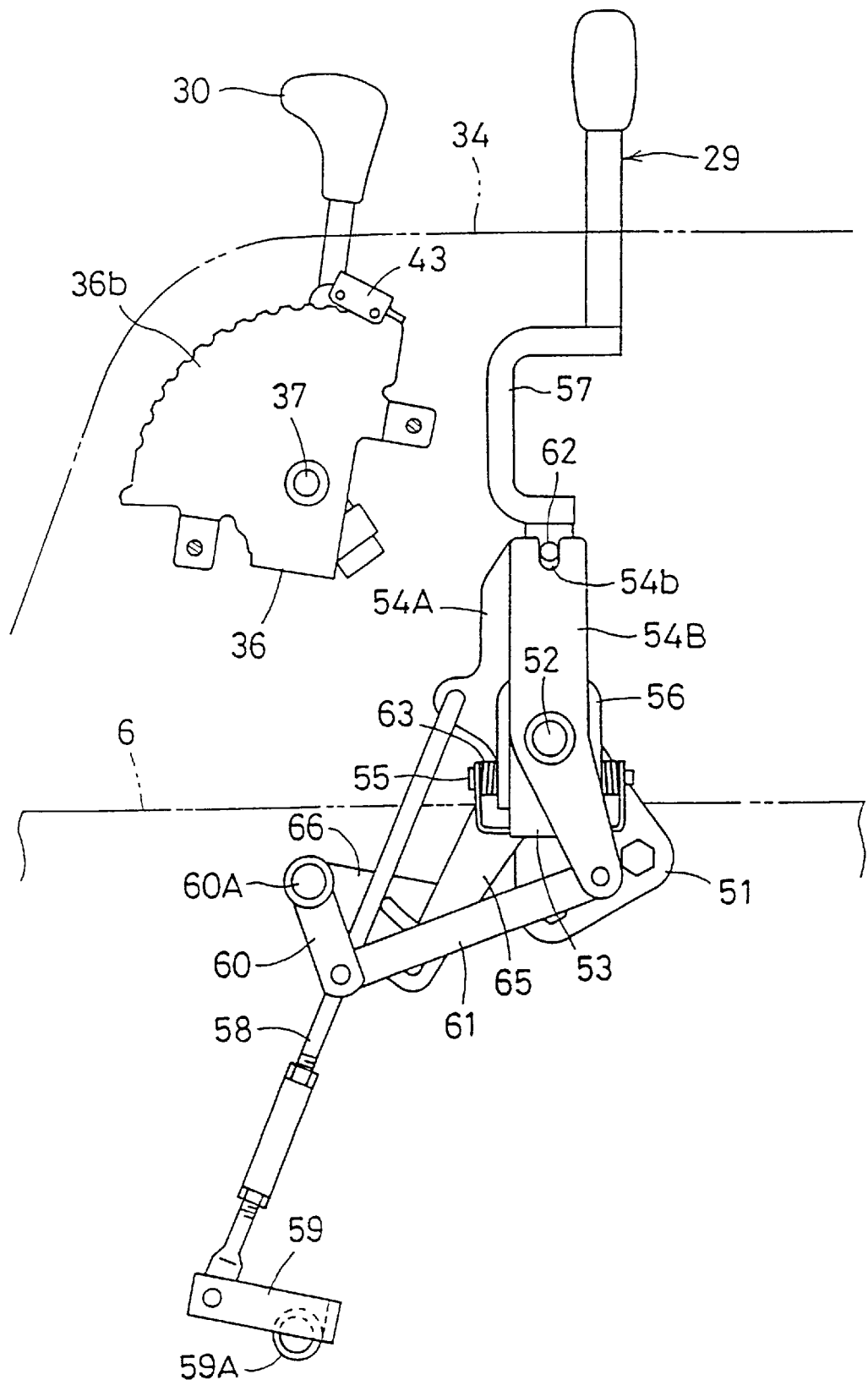
FIG. 6 is a side view of a shift lever and a switching device.
Figure 7:
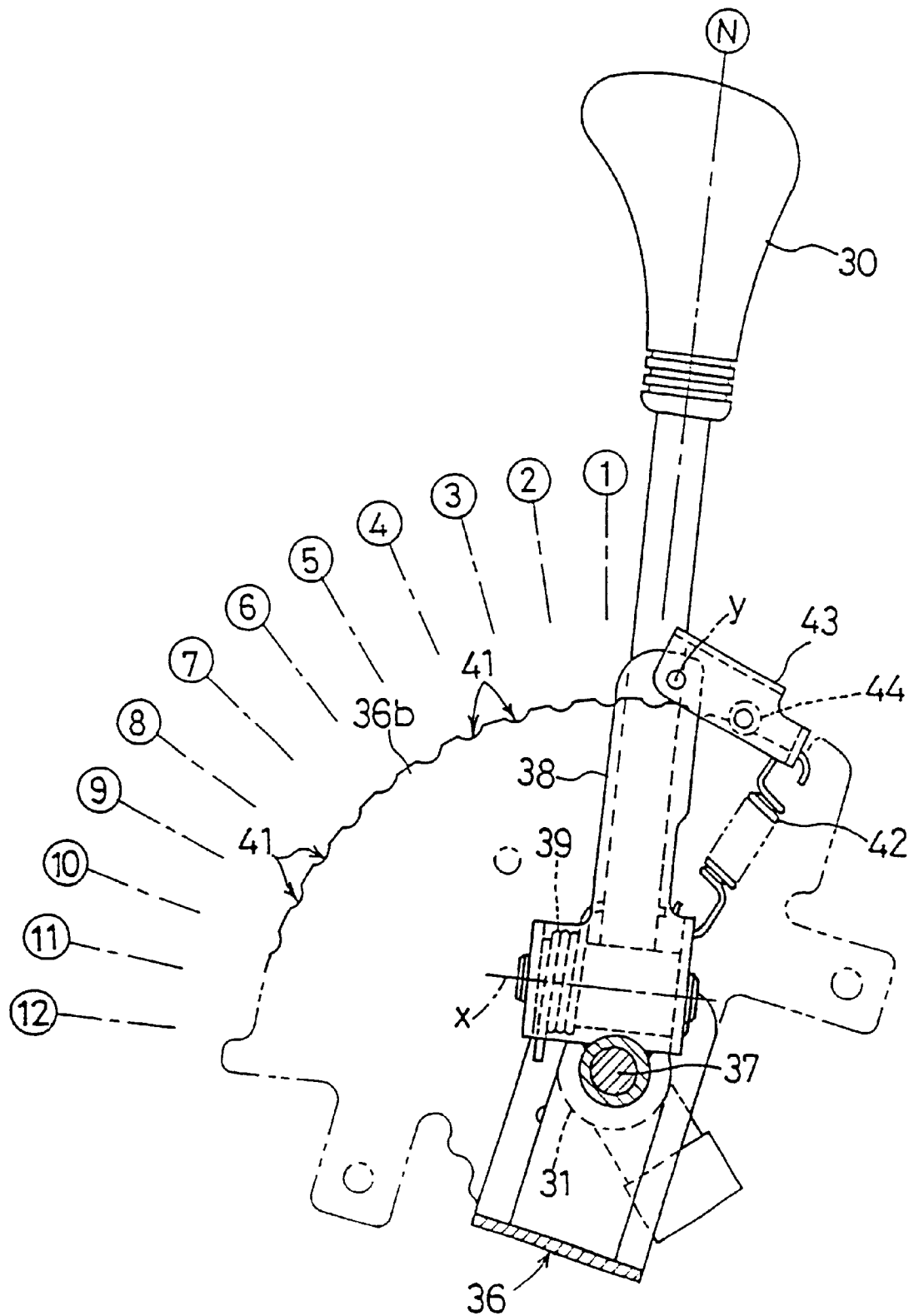
FIG. 7 is a side view of the shift lever and adjacent components.

As shown in FIGS. 5, 6, and 7, the shift lever 30 projects from a guide groove 35A of a lever guide 34 fixed to an inward wall of a left rear wheel fender 33. The shift lever 30 has a neutral position N at the rear end of its operating stroke, and shift positions for 12 forward stages and 8 backward stages arranged forwardly of the neutral position.

Figure 8:
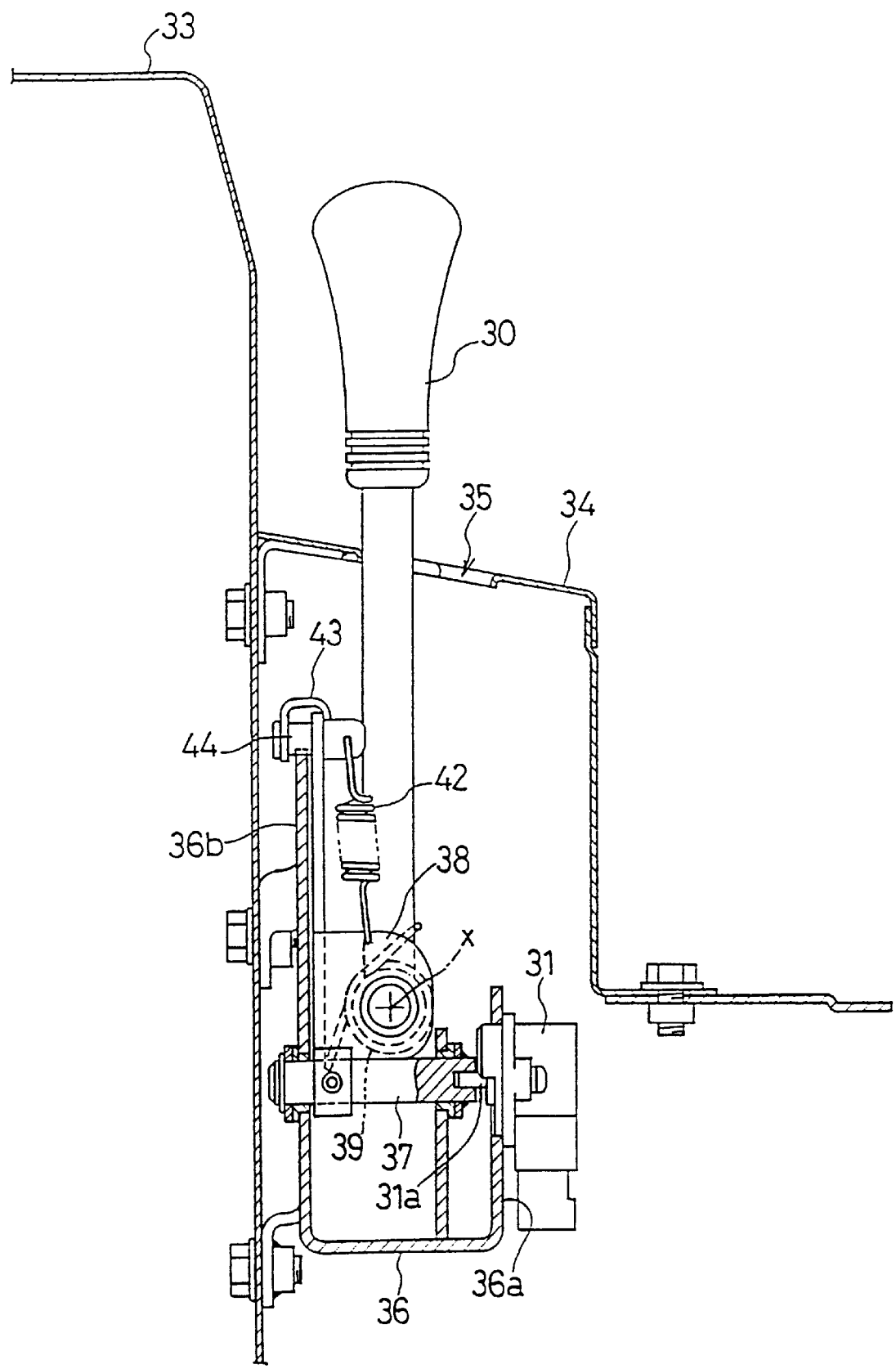
FIG. 8 is a rear view of the shift lever and adjacent components.

A support bracket 36 formed of sheet metal is fixed to the inward wall of the rear wheel fender 33. The support bracket 36 supports a support shaft 37 extending sideways to be rotatable relative to the bracket 36, with a lever fulcrum member 38 fixed to the support shaft 37. The shift lever 30 has a proximal end thereof pivotally connected to the lever fulcrum member 38 to be rockable right and left about a fore and aft pivotal axis x extending perpendicular to the support shaft 37. As shown in FIG. 8, the potentiometer 31 is attached to a support piece 36a formed integral with the support bracket 36. The potentiometer 31 has an operating rod 31a thereof coaxially coupled to the support shaft 37. Thus, the potentiometer 31 detects a fore and aft rocking position of the shift lever 30.

The shift lever 30 is constantly biased leftward by a torsion spring 39 mounted on the pivotal axis x, whereby the shift lever 30 is guided to move along the left edge of the guide groove 35A which is in a staggered form.

The support bracket 36 has a positioning plate 36b formed integral therewith and upstanding in a sector shape as seen from a side. The positioning plate 36b has an outer peripheral edge defining positioning recesses 41 corresponding to the neutral and 12 shift positions. The lever fulcrum member 38 has a detent arm 43 attached thereto to be vertically oscillatable about an axis y and biased downward by a spring 42. The detent arm 43 carries a roller 44 for resiliently fitting into the positioning recesses 41 on the outer peripheral edge of positioning plate 36b, thereby steadily maintaining the shift lever 30 in the neutral and 12 shift positions.

FIG. 15 shows a relationship between the 12 forward speeds provided by operating the shift lever 30, and positions of the main change speed mechanism 11, auxiliary change speed mechanism 15 and high/low change speed mechanism 14.

Specifically, for the first forward speed, the main change speed mechanism 11 is shifted to the first speed position, the auxiliary change speed mechanism 15 to the position for low speed "L", and the high/low change speed mechanism 14 to the position for low speed "Lo". For the second forward speed, the main change speed mechanism 11 is maintained in the first speed position and the auxiliary change speed mechanism 15 in the position for low speed "L", and the high/low change speed mechanism 14 is switched to the position for high speed "Hi". For the third forward speed, the main change speed mechanism 11 is shifted to the second speed position, the auxiliary change speed mechanism 15 to the position for low speed "L", and the high/low change speed mechanism 14 to the position for low speed "Lo". For the fourth forward speed, the main change speed mechanism 11 is maintained in the second speed position and the auxiliary change speed mechanism 15 in the position for low speed "L", and the high/low change speed mechanism 14 is switched to the position for high speed "Hi". For the fifth forward speed, the main change speed mechanism 11 is shifted to the third speed position, the auxiliary change speed mechanism 15 to the position for low speed "L", and the high/low change speed mechanism 14 to the position for low speed "Lo". For the sixth forward speed, the main change speed mechanism 11 is maintained in the third speed position and the auxiliary change speed mechanism 15 in the position for low speed "L", and the high/low change speed mechanism 14 is switched to the position for high speed "Hi". For the seventh forward speed, the main change speed mechanism 11 is shifted to the fourth speed position, the auxiliary change speed mechanism 15 to the position for low speed "L", and the high/low change speed mechanism 14 to the position for low speed "Lo". For the eighth forward speed, the main change speed mechanism 11 is maintained in the fourth speed position and the auxiliary change speed mechanism 15 in the position for low speed "L", and the high/low change speed mechanism 14 is switched to the position for high speed For the ninth to 12th forward speeds, the main change speed mechanism 11 is switched from the first speed position to the fourth speed position, with the auxiliary change speed mechanism 15 maintained in the position for high speed "H" and the high/low change speed mechanism 14 in the position for high speed "Hi".

The above shift positions for the first to 12th forward speeds are adopted regardless of the ON/OFF states of the super-reduction mechanism 16. For example, when the super-reduction is switched on or switched off, the first forward speed is provided by the main change speed mechanism 11 shifted to the first speed position, the auxiliary change speed mechanism 15 to the position for low speed "L", and the high/low change speed mechanism 14 to the position for low speed "Lo".

Figure 14:
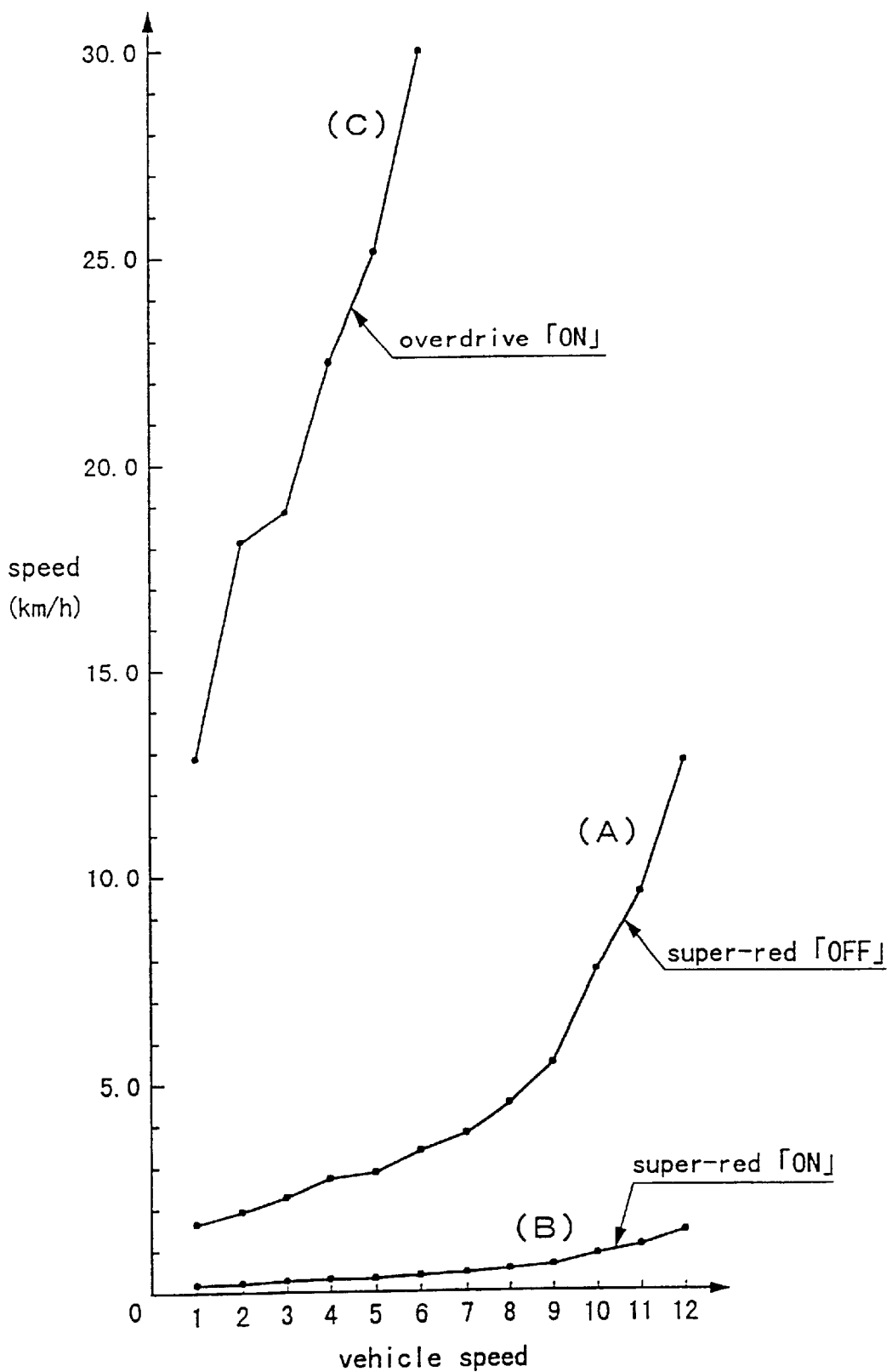
FIG. 14 is a graph showing speed distribution characteristics.

FIG. 14 shows one example of forward speed distribution characteristics. In FIG. 14, line (A) shows characteristics obtained from an ordinary run with the super-reduction mechanism 16 set "inoperative", while line (B) shows characteristics obtained from an ultra-slow operational run with the super-reduction mechanism 16 set "operative". For an ordinary plowing operation, a low-speed range from the first to eighth forward speeds with characteristics (A) is selected. For road running, a high-speed range from the ninth to 12th forward speeds with characteristics (A) is selected. Line (C) shows characteristics obtained from a high-speed run with the overdrive mechanism 45 set "operative", in which the first to sixth forward speeds are selected. The construction and operation of overdrive mechanism 45 will be described hereinafter. Thus, speed may be changed by finely defined stages in the low-speed range during an operational run. During a road run, speed may be changed by broad and not unduly fine stages.

Figure 9:
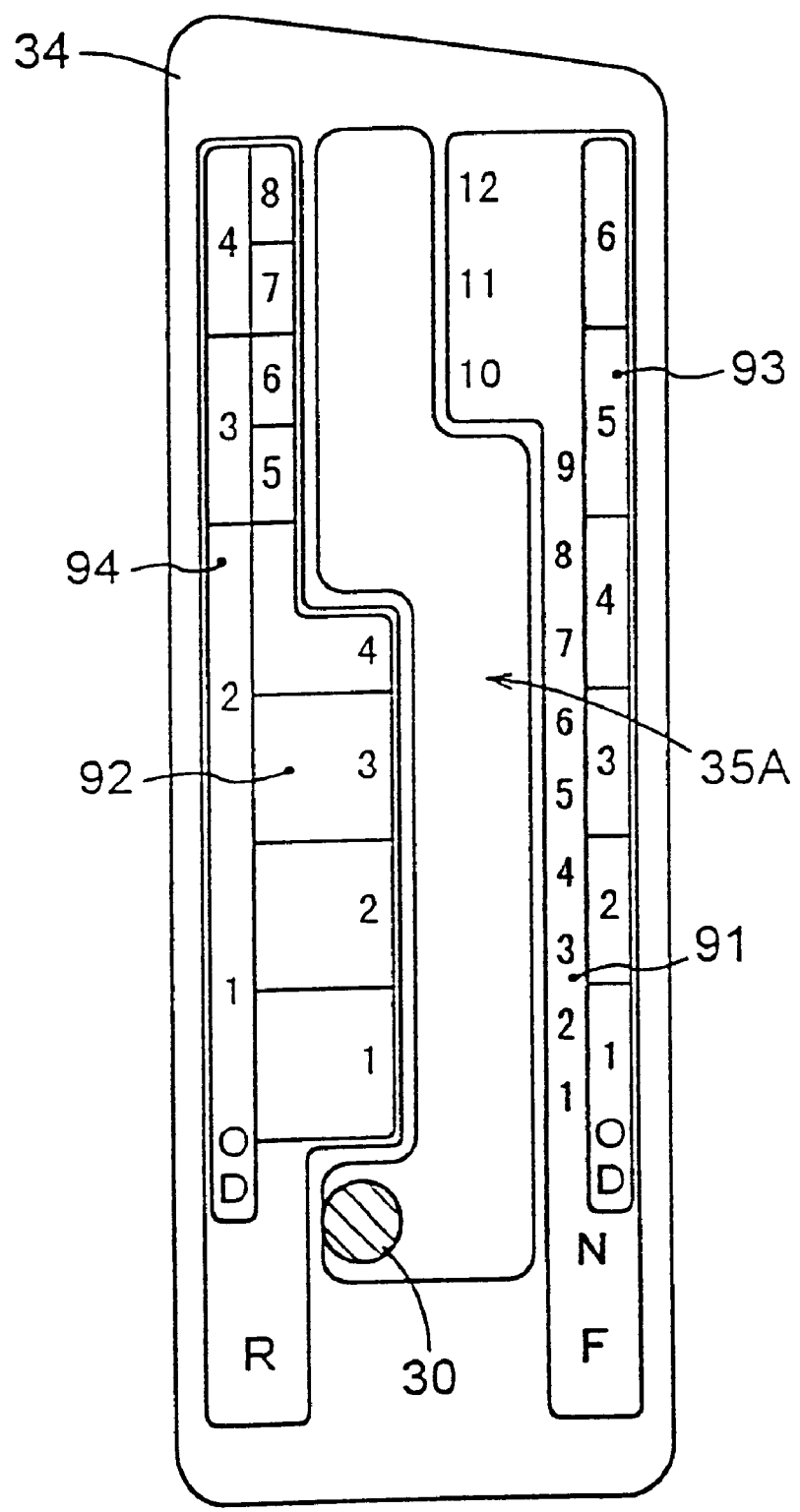
FIG. 9 is a plan view of a shift lever guide.

When the backward and forward drive switching lever 22 is operated to a "back" position, power is transmitted from the main change speed mechanism 11 to the auxiliary change speed mechanism 15 without passing through the high/low change speed mechanism 14. Thus, eight speeds are provided by the combination of main and auxiliary change speed mechanisms 11 and 15. That is, in the backward driving state, as shown in FIG. 9, the first and second forward speed positions correspond to the first backward speed position. The third and fourth forward speed positions correspond to the second backward speed position. The fifth and sixth forward speed positions correspond to the third backward speed position. The seventh and eighth forward speed positions correspond to the fourth backward speed position. The ninth to 12th forward speed positions correspond to the fifth to eighth backward speed position.

Upon detection of a shift position of shift lever 30, the electromagnetic unloading valves V1–V6 are controlled to shift required shift sleeves S1–S5 by means of hydraulic cylinders C1–C5. The electromagnetic control valve V7 also is controlled at this time. An example of such change speed control will be described hereinafter.

FIG. 4 shows a state for providing the second forward speed where the main change speed mechanism 11 is in the first speed position, the auxiliary change speed mechanism 15 in the position for low speed "L", and the high/low change speed mechanism 14 in the position for high speed "Hi". In this state, the change speed clutch 12 is engaged by pressure oil from a pump P. When the shift lever 30 is moved from the second forward speed position to the third forward speed position, the electromagnetic unloading valves V1, V2 and V5 are reversed and the hydraulic cylinders C1 and C4 are contracted to switch the main change speed mechanism 11 from the first speed position to the second speed position, and the high/low change speed mechanism 14 from the position for high speed "Hi" to the position for low speed "Lo".

When the hydraulic cylinders C1 and C4 begin a shifting operation, check valves 46 are thereby mechanically opened to reduce the pressure in an oil line 47. Then, the pilot operated unloading valve V9 using the pressure in the oil line 47 as a pilot pressure is switched by a return spring to drain pressure oil from the propelling hydraulic clutch 12. The clutch 12 is thereby automatically disengaged to allow smooth shifting of the shift sleeves S1 and S4.

When the shift sleeves S1 and S4 are shifted to predetermined shift positions, the hydraulic cylinders C1 and C4 stop their action for forcibly opening the check valves 46. The check valves 46 are closed again, whereby the pressure in the oil line 47 begins to increase to switch the unloading valve V9 to the position for supplying pressure oil to the propelling hydraulic clutch 12. In this case, the pressure increase in the oil line 47 is detected by a pressure sensor PS, which starts a control of an opening degree of the electromagnetic proportion control valve V8. The pressure of pressure oil supplied to propelling hydraulic clutch 12 is gradually increased with a predetermined characteristic, to engage the clutch 12 with no shock.

Overdrive shifting operations will be described next. In these operations, the overdrive mechanism 45 is engaged or disengaged, and the shift lever 30 is operated to provide six forward speeds and four backward speeds. Shift positions of the main change speed mechanism 11, auxiliary change speed mechanism 15 and high/low change speed mechanism 14 are as shown in FIG. 15. The auxiliary change speed mechanism 15 is constantly in neutral.

Specifically, for the first forward overdrive speed, the main change speed mechanism 11 is shifted to the first speed position, and the high/low change speed mechanism 14 to the position for high speed "Hi". For the second forward overdrive speed, the main change speed mechanism 11 is shifted to the second speed position, and the high/low change speed mechanism 14 is maintained in the position for high speed "Hi". For the third forward overdrive speed, the main change speed mechanism 11 is shifted to the third speed position, and the high/low change speed mechanism 14 is switched to the position for low speed "Lo". For the fourth forward overdrive speed, the main change speed mechanism 11 is maintained in the third speed position, and the high/low change speed mechanism 14 is switched to the position for high speed "Hi". For the fifth forward overdrive speed, the main change speed mechanism 11 is shifted to the fourth speed position, and the high/low change speed mechanism 14 is switched to the position for low speed "Lo". For the sixth forward overdrive speed, the main change speed mechanism 11 is maintained in the fourth speed position, and the high/low change speed mechanism 14 is switched to the position for high speed "Hi".

Shift positions for backward overdrive speeds are as in FIG. 16.

That is, the auxiliary change speed mechanism 15 is maintained neutral, the high/low change speed mechanism 14 plays no part in these shifting operations, the overdrive mechanism 45 is engaged, and the main change speed mechanism 11 is shifted to provide four speeds in the backward overdrive shifting operations. Though not described, operations for the other speed stages are basically the same as above. The propelling clutch is disengaged during the operation of the shift sleeves. Upon completion of the shifting operation, the propelling clutch is engaged with predetermined pressure increase characteristic.

Next, specific speeds and shift positions in the overdrive states (OD) are listed below.

| OD fwd | fwd speed | main c.s. mech | OD bwd | bwd speed |
|---|---|---|---|---|
| 1st | 13 km/h | 1st position | 1st | 12 km/h |
| 2nd | 18 | 2nd position | | |
| 3rd | 19 | 3rd position | 2nd | 16 |
| 4th | 23 | 3rd position | | |
| 5th | 25 | 4th position | 3rd | 20 |
| 6th | 30 | 4th position | 4th | 27 |

As noted above, when switching is made from forward drive to backward drive with the main change speed mechanism 11 set to a shift position, the speed is reduced for the backward drive. In the above case, forward speeds are set higher than backward speeds. However, backward speeds may be set higher than forward speeds. In the overdrive low-speed region, the backward speed is higher than the forward speed. The forward speed may be higher than the backward speed in the overdrive high-speed region. Such a speed setting will facilitate steering of the tractor.

It will be understood from the above description that 12 speeds are provided in the state of super-reduction, and six speeds in the state of overdrive, so that different numbers of speeds are available for different running modes. Thus, the number of speeds for super-reduction is different from the number of speeds for overdrive.

A mounting structure for the switching device 29 will be described hereinafter.

Figure 10:
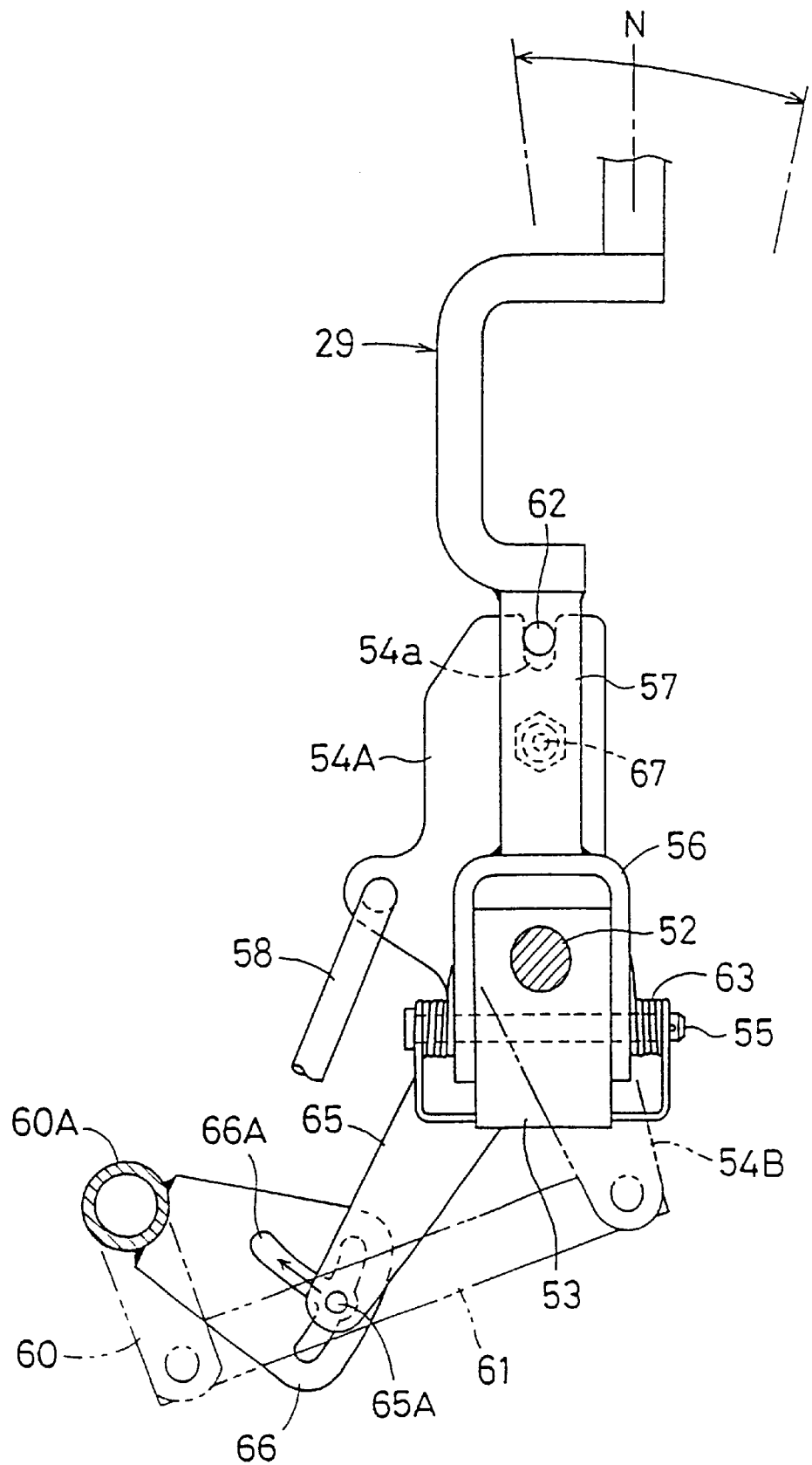
FIG. 10 is a side view of the switching device.
Figure 11:
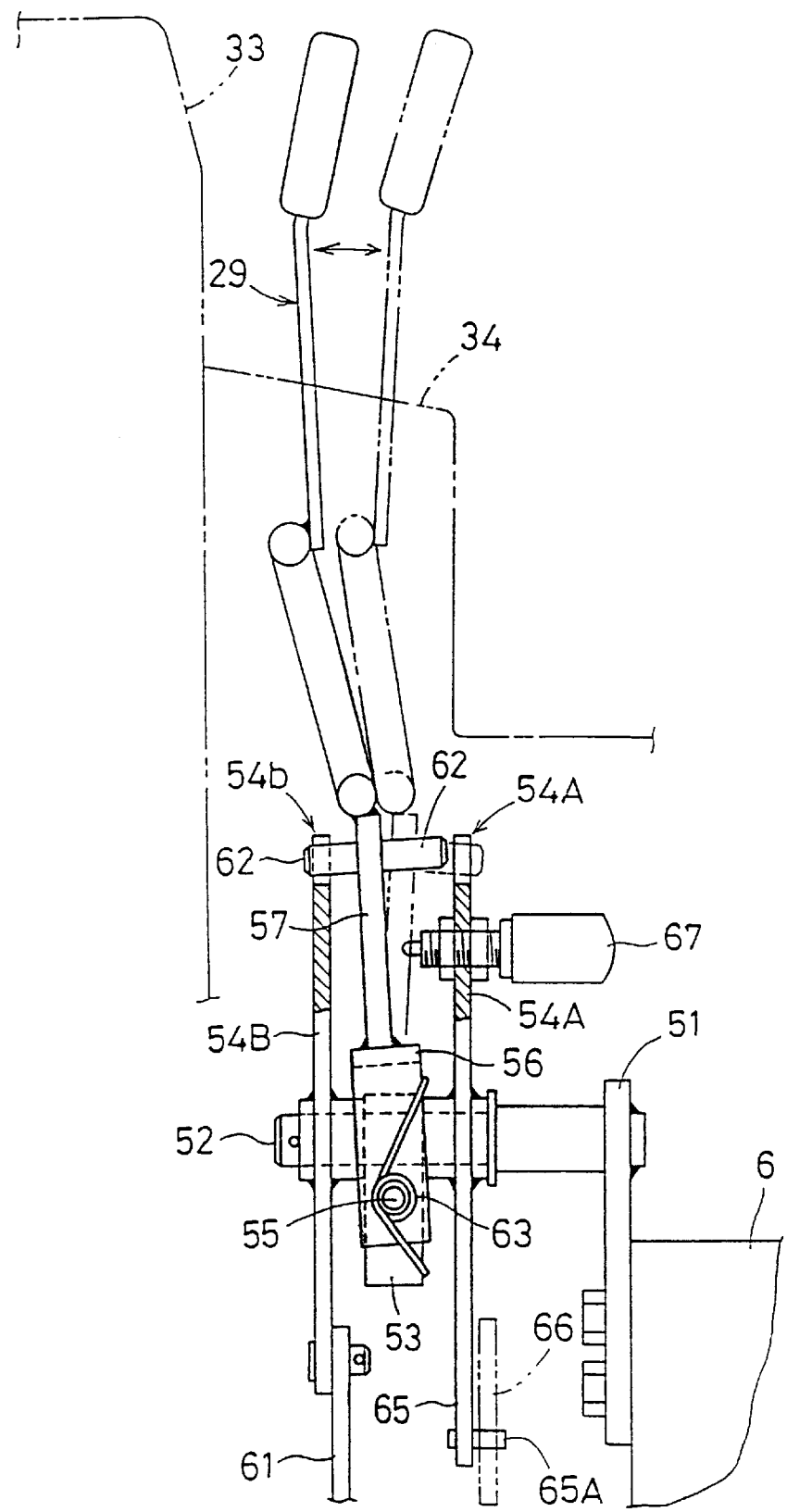
FIG. 11 is a rear view of the switching device.

As shown in FIGS. 8, 10 and 11, a bracket 51 is erected from a side wall of transmission case 6, and a support shaft 52 extends sideways from the bracket 51. The support shaft 52 supports a rocking block 53, and two interlocking frames 54A and 54B freely rotatably mounted on the shaft 52 at opposite sides of the rocking block 53. Of the two interlocking frames 54A and 54B, the one 54A disposed adjacent the transmission case 6 is used for overdrive, and the other 54B on a distal portion of support shaft 52 is used for super-reduction. A pivot pin 55 is disposed under the support shaft 52 to extend parallel to the side wall of transmission case 6. The pivot pin 55 is inserted into and supported by the rocking block 53. The pivot pin 55 supports a proximal end frame 56 to be pivotable right and left about the axis of pivot pin 55. A control arm 57 is attached to an upper surface of proximal end frame 56 to constitute the switching device 29. The switching device 29 having the above construction is pivotable fore and aft about the axis of support shaft 52 extending sideways, and also is pivotable right and left about the pivot pin 55.

An operation linkage structure for overdrive and super-reduction will be described next. As shown in FIGS. 6 and 10, an interlocking rod 58 extends downward from the overdrive interlocking frame 54A. The interlocking rod 58 is operatively connected at a lower end thereof to an arm 59 for driving the shift sleeve S7. The arm 59 is supported to be pivotable about a shaft 59A. The super-reduction interlocking frame 54B are interlocked through an interlocking rod 61 to an arm 60 for driving the super-reduction shift sleeve S6.

The operation linkage structure for overdrive and super-reduction includes a linkage structure between the switching device 29 and two interlocking frames 54A and 54B which will be described next. As shown in FIG. 11, the switching device 29 has an interlocking pin 62 projecting therefrom toward the two interlocking frames 54A and 54B. On the other hand, the two interlocking frames 54A and 54B have recesses 54a and 54b formed at upper ends thereof, respectively, for engaging the interlocking pin 62. The interlocking pin 62 is shorter than a spacing between the two interlocking frames 54A and 54B, but has a length for engages the recess 54a or 54b when the switching device 29 is tilted toward either interlocking frame.

Figure 13:
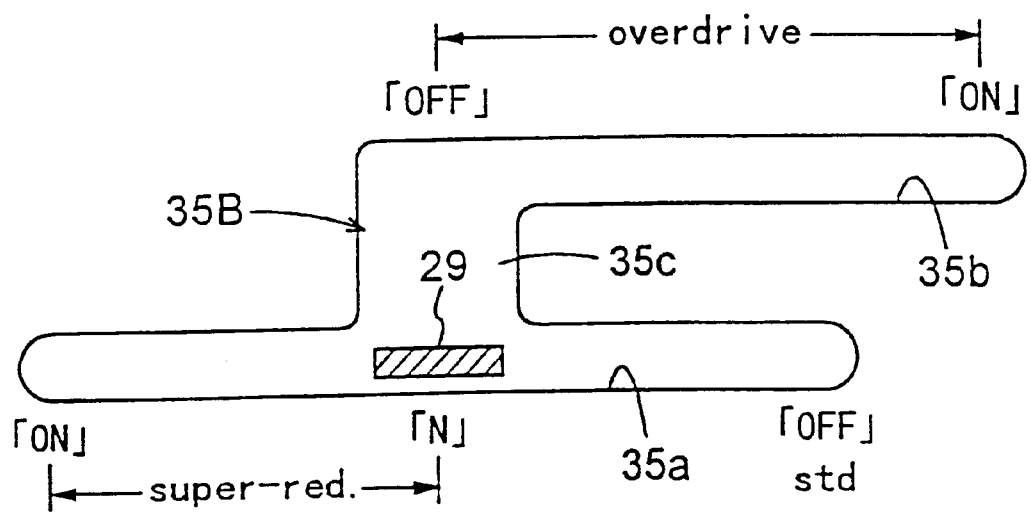
FIG. 13 is a plan view of a switching device guide groove.

The switching device 29 is biased by a coil spring 63 to tilt toward the super-reduction interlocking frame 54B. A super-reduction control may be performed by operating, fore and aft about the support shaft 52, the switching device 29 biased toward the interlocking frame 54B. When the switching device 29 is tilted to the opposite side against the biasing force of coil spring 63, the interlocking pin 62 engages the recess 54a. The switching device 29 is thereby interlocked to the overdrive interlocking frame 54A for overdrive controls. The switching device 29 is disposed rearwardly of the shift lever 30. The switching device 29 is guided by a guide groove 35B formed in the lever guide 34. As shown in FIG. 13, the guide groove 35B includes a straight groove region 35a for super-reduction, a bridge region 35c extending at right angles from an intermediate point of the straight groove region 35a corresponding to the neutral position of super-reduction mechanism 16, and a straight groove region 35b for overdrive extending from the end of bridge region 35c parallel to the groove region 35a for super-reduction Thus, the switching device 29 is not switchable to the overdrive control without being set to neutral in the super-reduction control.

As noted above, the controls for overdrive and super-reduction cannot be executed at the same time. A mechanism for checking such a simultaneous operation is provided for the lever side also. That is, as shown in FIG. 10, a checking arm 65 is provided to be pivotable fore and aft about the sideways extending support shaft 52 of the switching device 29, and a checked arm 66 is attached to a rotary shaft 60A of drive arm 60 for super-reduction. The checking arm 65 is formed integral with the interlocking frame 54A. The checking arm 65 has an engaging pin 65A formed at a distal end thereof. The checked arm 66 defines a cruciform engaging groove 66A. When the engaging pin 65A is the center position of the engaging groove 66A as illustrated, the super-reduction is in neutral state and the engaging pin 65A can move in the direction indicated by an arrow. That is, the switching device 29 is operable for the overdrive control. When the engaging pin 65A is displaced from the center position, the checking arm 66 is prevented from making a pivotal movement.

As shown in FIG. 11, the interlocking frame 54A has a contact sensor 67 mounted thereon. When the switching device 29 tilted to the overdrive side, the control arm 57 acts on the contact sensor 67 to indicate that the switching device 29 is placed in neutral for the overdrive control. The switching device 29 is engaged with the interlocking arm 54A through the interlocking pin 62. When the switching device 29 is moved along the overdrive guide groove region 35b, the switching device 29 and interlocking arm 54A swing together. The contact sensor 67 attached to the interlocking arm 54A swings also to maintain contact with the control arm 57.

This contact sensor 67 acts as a start-of-operation detecting device for detecting the switching device 29 reaching a point for starting operation of the overdrive mechanism 45. The contact sensor 67 is attached to the interlocking arm 54A to detect the switching device 29 from the time this device is operated to a neutral position of overdrive. This is done because the change speed shaft 25 of auxiliary change speed mechanism 15 acts also as an input shaft 48 of overdrive mechanism 45, and the auxiliary change speed mechanism 15 must be placed in neutral.

Figure 12:
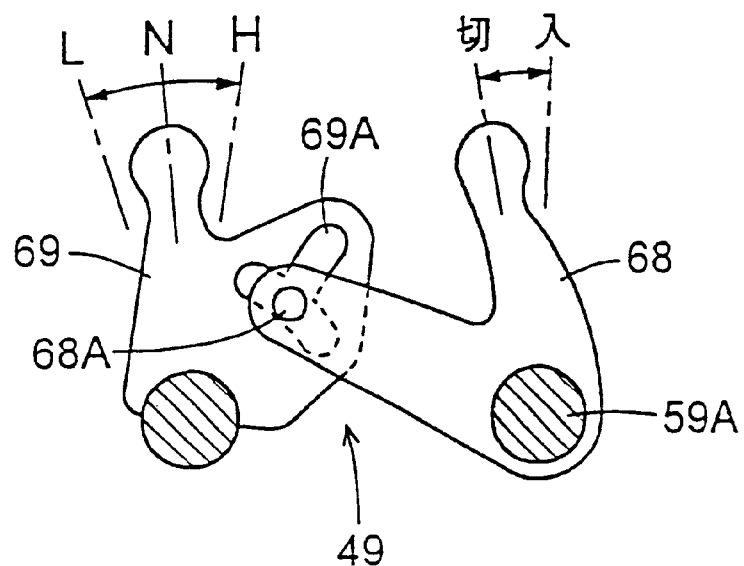
FIG. 12 is a view showing a mechanism for preventing a simultaneous engagement of an overdrive mechanism and an auxiliary change speed mechanism.

As shown in FIG. 11 and 12, a check mechanism 49 is required for disabling operation of the auxiliary change speed mechanism 15 in time of overdrive. The check mechanism 49 is constructed as follows. As shown in FIGS. 6 and 11, a shift arm 68 mounted in the transmission case attached to the rotary shaft 59A to which the overdrive arm 59 is attached, is disposed close to an auxiliary change speed shift arm 69 which operates the shift sleeve S5 of auxiliary change speed mechanism 15. The shift arm 68 has an engaging pin 68A formed thereon, while the auxiliary change speed shift arm 69 defines a cruciform engaging groove 69A for receiving the engaging pin 68A.

As shown in FIG. 12, when the auxiliary change speed mechanism 15 is in neutral, the engaging pin 68A is the center position of the engaging groove 69A to render the overdrive mechanism 45 operable. When the engaging pin 68A is displaced from the center position of engaging groove 69A, the checking arm 68 is prevented from making a pivotal movement, thereby disabling controls of the overdrive mechanism 15.

This mechanism performs its function when the contact sensor 67 fails. That is, when the contact sensor 67 fails, the control for returning the auxiliary change speed mechanism 15 to neutral becomes inoperable. Consequently, when the auxiliary change speed mechanism 15 is placed in a shift position other than the neutral position, the engaging pin 68A contacts the engaging groove 69A to prevent the switching device 29 from moving into the overdrive control region. Thus, the check mechanism 49 acts as a countermeasure against failure.

After the state of overdrive is selected by the switching device 29, shifts among the plurality of speeds are executed by the shift lever 30. Since the overdrive shifting operations are carried out by means of the shift lever 30, overdrive speed stages are indicated on the control guide surface along the guide groove 35A of lever guide 34. Specifically, as shown in FIG. 9, the lever guide 34 includes an overdrive-OFF forward speed display 91 and an overdrive-OFF backward speed display 92 are provided on opposite sides of the guide groove 35A. An overdrive-ON forward speed display 93 and an overdrive-ON backward speed display 94 are arranged outwardly of the speed displays 91 and 92, respectively. Of course, this speed display arrangement may be varied.

[Other Embodiments]

The invention may be implemented in the following forms also.

In the foregoing embodiment, the main change speed mechanism 11, auxiliary change speed mechanism 15 and high/low change speed mechanism 14 are operable by the single shift lever 30. This construction may be modified such that the main change speed mechanism 11 and auxiliary change speed mechanism 15 are operable by a single shift lever, and the high/low change speed mechanism 14 operable by a switch mounted on the grip of the shift lever.

The change speed mechanisms per se may be in a form other than the described form shiftable by the hydraulic cylinders. It will be easy to adopt a construction where, for example, a hydraulic clutch is provided for each speed, and a desired speed is produced by selecting a group of clutches.

The high/low change speed mechanism 14 may be the planetary gear type rather than the shift type.

The start-of-operation detecting device 67 may comprise a limit switch with a contact piece pivotable for a switching operation, or the pressure type such as a piezoelectric element.

What is claim is:

1. A tractor transmission comprising:
   a change speed mechanism;
   a shift lever for shifting said change speed mechanism;
   a super-reduction mechanism for decelerating and outputting power inputted thereto, said super-reduction mechanism having a larger reduction ratio than said change speed mechanism;
   an overdrive mechanism for accelerating and outputting power inputted thereto; and
   a single switching device for operating both said super-reduction mechanism and said overdrive mechanism, said switching device is shiftable, when said super-reduction mechanism is in neutral, from a state of operating said super-reduction mechanism to a state of operating said overdrive mechanism.

2. A tractor transmission as defined in claim 1, wherein said switching device has a shifting region including a super-reduction control region for operating said super-reduction mechanism, an overdrive control region for operating said overdrive mechanism, and a bridge region bridging said super-reduction control region and said overdrive control region, said super-reduction mechanism being in neutral when said switching device is located at a point in said super-reduction control region for shifting to said bridge region.

3. A tractor transmission as defined in claim 2, wherein said bridge region extends substantially perpendicular to said super-reduction control region and said overdrive control region.

4. A tractor transmission as defined in claim 2, further comprising an overdrive detecting sensor for detecting said switching device having shifted from said bridge region to said overdrive control region.

5. A tractor transmission as defined in claim 1, further comprising a speed display surface for displaying speed stages of said overdrive mechanism as well as speed stages of said change speed mechanism.

6. A tractor transmission as defined in claim 1, wherein said change speed mechanism includes a main change speed mechanism, an auxiliary change speed mechanism and a high/low change speed mechanism.

7. A tractor transmission as defined in claim 6, wherein said change speed mechanism has a speed stage determined by a shift position of said shift lever, said speed stage being variable with a control position of said switching device.

8. A tractor transmission comprising:
   a change speed mechanism;
   a shift lever for shifting said change speed mechanism;
   a super-reduction mechanism for decelerating and outputting power inputted thereto, said super-reduction mechanism having a larger reduction ratio than said change speed mechanism;
   an overdrive mechanism for accelerating and outputting power inputted thereto; and
   a switching device for switching said overdrive mechanism;
   wherein said change speed mechanism has a speed stage determined by a shift position of said shift lever, said speed stage being variable with a control position of said switching device.

* * * * *